(12) United States Patent
Saimura et al.

(10) Patent No.: US 8,579,322 B2
(45) Date of Patent: Nov. 12, 2013

(54) CURTAIN AIRBAG SYSTEM

(75) Inventors: Kazuya Saimura, Susono (JP);
Shunichi Katsumata, Susono (JP);
Hitoshi Kawabe, Susono (JP)

(73) Assignees: Toyota Jidosha Kabushiki Kaisha,
Totoya-shi (JP); Toyoda Gosei Co., Ltd.,
Kiyosu-shi (JP)

( * ) Notice: Subject to any disclaimer, the term of this patent is extended or adjusted under 35 U.S.C. 154(b) by 0 days.

(21) Appl. No.: 13/494,246

(22) Filed: Jun. 12, 2012

(65) Prior Publication Data

US 2012/0313356 A1    Dec. 13, 2012

(30) Foreign Application Priority Data

Jun. 13, 2011  (JP) ................................. 2011-131308

(51) Int. Cl.
*B60R 21/232*  (2011.01)
*B60R 21/233*  (2006.01)
*B60R 21/213*  (2011.01)

(52) U.S. Cl.
USPC ........................................ 280/729; 280/730.2

(58) Field of Classification Search
CPC .. B60R 21/213; B60R 21/214; B60R 21/232; B60R 21/233; B60R 2021/23192
USPC ................. 280/729, 730.1, 730.2, 743.1, 749
See application file for complete search history.

(56) References Cited

U.S. PATENT DOCUMENTS

| | | | |
|---|---|---|---|
| 5,566,977 A * | 10/1996 | Wipasuramonton | 280/743.1 |
| 6,220,625 B1 * | 4/2001 | Wallner et al. | 280/730.2 |
| 6,273,457 B1 | 8/2001 | Fischer | |
| 6,296,276 B1 * | 10/2001 | Ritter | 280/743.2 |
| 6,394,487 B1 | 5/2002 | Heudorfer et al. | |
| 6,409,211 B1 * | 6/2002 | Sheng et al. | 280/730.2 |
| 6,450,527 B2 * | 9/2002 | Kobayashi et al. | 280/729 |
| 6,457,740 B1 * | 10/2002 | Vaidyaraman et al. | 280/730.2 |

(Continued)

FOREIGN PATENT DOCUMENTS

| JP | 2000-326816 A | 11/2000 |
|---|---|---|
| JP | 2000335356 A | 12/2000 |

(Continued)

OTHER PUBLICATIONS

Anatomy of a Crash-Test Dummy, by Erico Guizzo, published in IEEE Spectrum on Oct. 2007, available at http://spectrum.ieee.org/computing/embedded-systems/anatomy-of-a-crashtest-dummy/0.*

*Primary Examiner* — Joseph Rocca
(74) *Attorney, Agent, or Firm* — Gifford, Krass, Sprinkle, Anderson & Citkowski, P.C.

(57) ABSTRACT

A curtain airbag system for a vehicle is stored in a folded state in a roof side portion, and includes a gas supply passage to be deployed along the roof side portion, a rear main chamber that is inflated and deployed below the gas supply passage in the event of a side impact or rollover of the vehicle, with gas supplied through the gas supply passage, a rear auxiliary chamber that is deployed at a front side of the rear main chamber in the event of at least rollover, with gas supplied through the gas supply passage or the rear main chamber, and a concave deployment portion having a looped line that restricts deployment of a part of the rear auxiliary chamber or a part of a space between the rear auxiliary chamber and the gas supply passage as seen in a side view.

7 Claims, 5 Drawing Sheets

(56) References Cited

U.S. PATENT DOCUMENTS

| | | | |
|---|---|---|---|
| 6,471,240 B2* | 10/2002 | Bakhsh et al. | 280/729 |
| 6,527,296 B2* | 3/2003 | Bakhsh et al. | 280/730.2 |
| 6,612,612 B2* | 9/2003 | Zerbe | 280/730.2 |
| 6,883,826 B2* | 4/2005 | Fujiwara | 280/730.2 |
| 6,932,386 B2* | 8/2005 | Ikeda et al. | 280/739 |
| 7,080,853 B2* | 7/2006 | Ogata | 280/730.2 |
| 7,207,595 B2* | 4/2007 | Kanto et al. | 280/730.2 |
| 7,278,655 B2* | 10/2007 | Inoue et al. | 280/730.2 |
| 7,287,778 B2* | 10/2007 | Suekuni | 280/730.2 |
| 7,396,041 B2* | 7/2008 | Noguchi et al. | 280/730.2 |
| 7,611,164 B2* | 11/2009 | Kai et al. | 280/729 |
| 7,766,378 B2* | 8/2010 | Miura et al. | 280/730.2 |
| 7,775,553 B2 | 8/2010 | Takemura et al. | |
| 7,963,552 B2 | 6/2011 | Tanaka et al. | |
| 8,020,888 B2* | 9/2011 | Cheal et al. | 280/730.2 |
| 8,033,568 B2* | 10/2011 | Tanaka et al. | 280/729 |
| 2004/0130128 A1* | 7/2004 | Bakhsh et al. | 280/730.2 |
| 2005/0206138 A1* | 9/2005 | Breuninger et al. | 280/729 |
| 2005/0269806 A1* | 12/2005 | Huber et al. | 280/730.2 |
| 2006/0138748 A1* | 6/2006 | Kino et al. | 280/728.1 |
| 2007/0138778 A1 | 6/2007 | Takemura et al. | |
| 2009/0236829 A1* | 9/2009 | Tanaka et al. | 280/728.2 |
| 2009/0243267 A1* | 10/2009 | Fletcher et al. | 280/730.2 |
| 2009/0283992 A1* | 11/2009 | Sugimori et al. | 280/730.2 |

FOREIGN PATENT DOCUMENTS

| | | |
|---|---|---|
| JP | 2001-171471 A | 6/2001 |
| JP | 2001-328503 A | 11/2001 |
| JP | 2002-240673 A | 8/2002 |
| JP | 2009-227163 A | 10/2009 |
| JP | 4550729 B | 9/2010 |
| JP | 4611882 B2 | 1/2011 |
| WO | 2007055420 A1 | 5/2007 |

* cited by examiner

CURTAIN AIRBAG SYSTEM

CROSS REFERENCE TO RELATED APPLICATIONS

This application claims priority to Japanese Patent Application No. 2011-131308 filed on Jun. 13, 2011, which is incorporated herein by reference in its entirety including the specification, drawings and abstract.

BACKGROUND OF THE INVENTION

1. Field of the Invention

The invention relates to a curtain airbag system.

2. Description of Related Art

A curtain airbag system is known which includes a main inflatable portion provided at a seating location at which an occupant is seated, and an auxiliary inflatable portion that is constantly in fluid communication with the main inflatable portion via a reduced-diameter portion and is located off the occupant seating location (see, for example, Japanese Patent Application Publication No. 2007-161163 (JP 2007-161163 A)). It is also known to provide a curtain airbag with a second deployment portion that extends below the belt line, at a location other than the occupant seating location (see, for example, Japanese Patent Application Publication No. 2007-161167 (JP 2007-161167 A)).

As one example of measures to ensure sufficient reaction force when the curtain airbag protects an occupant against rollover of the vehicle, the thickness of the curtain airbag is increased. In this case, the volume of the curtain airbag, or the capacity of the inflator, is increased.

SUMMARY OF THE INVENTION

The invention provides a curtain airbag system that has an airbag including first and second deployment portions, and ensures occupant protection performance in the event of rollover, without increasing the volume or capacity of the airbag.

A curtain airbag system for a vehicle according to one aspect of the invention includes a curtain airbag that is stored in a folded state in an upper edge portion of a portion of a vehicle body in which a side windshield is mounted, and the curtain airbag includes a gas supply passage that is deployed along the upper edge portion of the portion of the vehicle body in which the side windshield is mounted, a first deployment portion to which gas is supplied through the gas supply passage, so that the first deployment portion is inflated and deployed below the gas supply passage in the event of a side impact or rollover of the vehicle, a second deployment portion to which gas is supplied through the gas supply passage or the first deployment portion, so that the second deployment portion is deployed at a vehicle front side of the first deployment portion, in the event of at least rollover of the vehicle, and a concave deployment portion formed within the second deployment portion or in a part of a space between the second deployment portion and the gas supply passage as seen in a side view, the concave deployment portion being defined by a looped line and operable to restrict deployment of a part of the second deployment portion or the part of the space between the second deployment portion and the gas supply passage. The looped line may be an annular stitched portion.

In the curtain airbag system according to the above aspect of the invention, at least the first deployment portion is deployed with gas supplied thereto, in the event of a side impact of the vehicle, so that the first deployment portion protects the head of the occupant against the side impact. In the event of rollover of the vehicle, on the other hand, the first deployment portion and the second deployment portion are deployed so as to restrict outward movement of the head of the occupant in the vehicle width direction, over a wide region extending in the vehicle longitudinal direction. In this manner, the head of the occupant is protected.

In the curtain airbag system of the invention, the concave deployment portion is formed within the second deployment portion or between the second development portion and the gas supply passage. The concave deployment portion has concave faces with which the head of the occupant contacts in the event of rollover; therefore, the curtain airbag having the concave deployment portion has a larger area of contact with the head of the occupant than a curtain airbag having no concave deployment portion. As a result, the frictional force applied to the head of the occupant is increased, and outward movement of the head of the occupant in the vehicle width direction is curbed or restricted due to the frictional force.

Thus, the curtain airbag system according to the above aspect of the invention ensures occupant protection performance or a sufficient capability of protecting the occupant against rollover, without increasing the volume of the airbag. In particular, it is useful to locate the concave deployment portion at a position where the head of the occupant is likely to strike the airbag in a rollover event.

In the curtain airbag system according to the above aspect of the invention, the annular stitched portion may have a generally triangular shape as seen in the side view, and the triangular stitched portion may operate to restrict deployment of the part of the second deployment portion or the part of the space between the second deployment portion and the gas supply passage as seen in the side view.

In the curtain airbag system constructed as described above, the concave deployment portion assumes a generally triangular shape as seen in a side view, which makes it easier to ensure sufficient thicknesses (when deployed) of deployment portions (the second deployment portion and the gas supply passage) located at the periphery of the concave development portion.

In the curtain airbag system as described above, the second deployment portion may be deployed below the gas supply passage as seen in the side view, and includes two cells that are arranged in a longitudinal direction of the vehicle, and the stitched portion having the generally triangular shape as seen in the side view may provide a partition between a lower edge of the gas supply passage and upper end portions of the cells arranged in the longitudinal direction.

In the curtain airbag system constructed as described above, the concave deployment portion is formed by making effective use of the space between the gas supply passage and the front and rear cells.

In the curtain airbag system according to the above aspect of the invention, the second deployment portion may be deployed so that a lower end portion of the second deployment portion is located below a belt line.

In the curtain airbag system constructed as described above, the lower end portion of the second deployment portion located below the belt line engages with a side door, so that reaction force produced when the head of the occupant is protected by the second deployment portion is favorably supported. With this arrangement, the protection performance with which the head of the front-seat occupant is protected is improved.

As explained above, the curtain airbag system according to the above aspect of the invention ensures occupant protection performance or a sufficient capability of protecting an occupant against rollover, without increasing the volume of the airbag.

BRIEF DESCRIPTION OF THE DRAWINGS

The features, advantages, and technical and industrial significance of this invention will be described in the following detailed description of exemplary embodiments of the invention with reference to the accompanying drawings, in which like numerals denote like elements, and wherein.

DETAILED DESCRIPTION OF EMBODIMENTS

A curtain airbag system 10 according to a first embodiment of the invention will be described with reference to FIG. 1 through FIG. 4. Arrows FR, UP, IN and OUT denoted in FIG. 1-FIG. 4 as needed represent the front direction (travelling direction), upward direction, inward as viewed in the vehicle width direction, and outward as viewed in the vehicle width direction, respectively, of an automobile V equipped with the curtain airbag system 10. When longitudinal and vertical directions are referred to in the following description, they are supposed to represent the longitudinal direction and vertical direction of the vehicle, respectively, unless otherwise specified.

Figure 1:
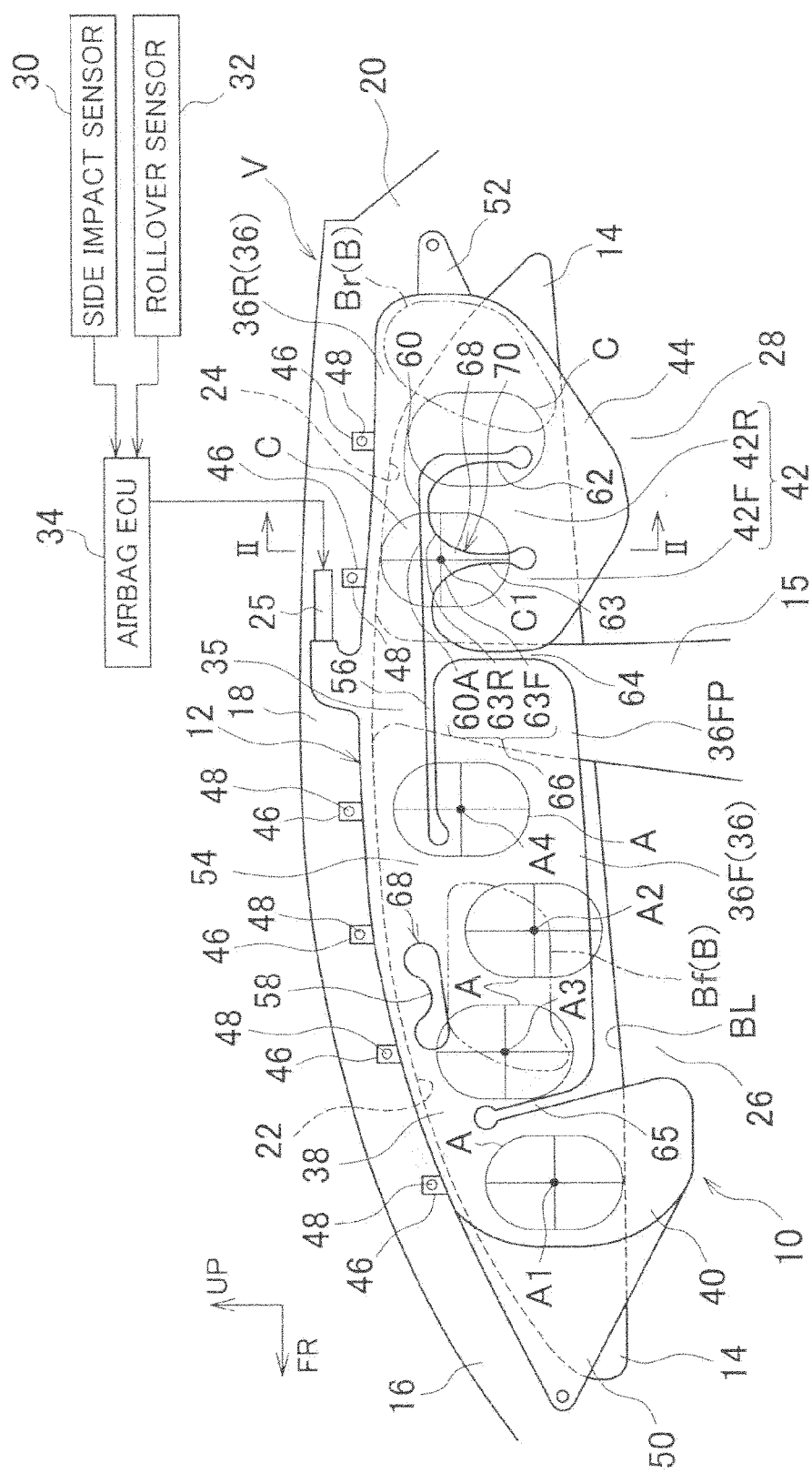
FIG. 1 is a side view as seen from the interior of the vehicle, schematically showing the overall construction of a curtain airbag system according to a first embodiment of the invention.

FIG. 1 is a side view showing the curtain airbag system 10 when viewed from the vehicle interior or compartment of the automobile V equipped with the system 10. As shown in FIG. 1, the curtain airbag system 10 includes a curtain airbag 12 as an airbag. The curtain airbag 12 is formed so as to be deployed like a curtain, along vehicle interior sides of side windshields 14, and a vehicle interior side of a center pillar (or B pillar) 15. In this embodiment, the curtain airbag 12 is configured to cover the front and rear side windshields 14 located on one side of a front seat and a rear seat.

Although not illustrated in the drawings, the curtain airbag 12 is rolled or accordion-folded into elongated form, for example, and then stored such that it extends from a front pillar (or A pillar) 16 to a roof side portion 18 until it comes close to a rear pillar 20. As will be described later, the curtain airbag 12 is deployed along the front and rear side windshields 14 and the center pillar 15, as shown in FIG. 1, so as to protect the heads of occupants seated in the front seat and rear seat. In this embodiment, a front door opening 22 serving as an opening through which passengers are getting in or off is surrounded or defined by the roof side portion 18, front pillar 16, and the center pillar 15, and a rear door openings 24 serving as an opening through which passengers are getting in or off is surrounded or defined by the roof side portion 18, center pillar 15 and the rear pillar 20. The roof side portion 18 forms upper edges of the front and rear door openings 22, 24. The curtain airbag 12 is stored between a roof side rail and a roof headlining which constitute the roof side portion 18.

The curtain airbag system 10 includes an inflator 25 for supplying gas into the curtain airbag 12. The inflator 25, which is of a combustion type or cold-gas type, is operated to generate gas, and supply the gas into the curtain airbag 12. A gas jetting port of the inflator 25 communicates with the interior of the curtain airbag 12. In this embodiment, the inflator 25 is installed in the roof side portion 18. The shape of the deployed curtain airbag 12 and the location of the inflator 25 will be described later.

The curtain airbag 12 and the inflator 25 as described above are provided at each of the opposite sides of the automobile V as viewed in the vehicle width direction. Namely, the curtain airbag system 10 includes a pair of right and left curtain airbags 12, and a pair of right and left inflators 25. Further, the curtain airbag system 10 includes an airbag ECU 34 electrically connected to a side impact sensor 30 and a rollover sensor 32, as shown in FIG. 1. The side impact sensor 30 is configured to predict or detect a side impact of the automobile V (or its unavoidableness), and output a side-impact detection signal to the airbag ECU 34. The rollover sensor 32 is configured to predict or detect rollover of the automobile V (or its unavoidableness), and output a rollover detection signal (which will be called "R/O detection signal") to the airbag ECU 34.

The airbag ECU 34 is electrically connected to each of the right and left inflators 25. In FIG. 1, the airbag ECU 34 is connected to only one of the inflators 25. The airbag ECU 34 is configured to operate the inflator 25 on the side-impact side (which will also be called "near side") when it receives a side-impact detection signal. Thus, when a side impact occurs to the automobile V, the curtain airbag 12 on the near side is inflated with gas supplied thereto, and is deployed. The airbag ECU 34 is also configured to operate the inflators 25 on the opposite sides as viewed in the vehicle width direction, when it receives an R/O detection signal. When receiving an R/O detection signal after a side impact, the airbag ECU 34 operates the inflator 25 opposite to the side-impact-side inflator 25 that has already been operated.

In the following, the construction of the curtain airbag 12 will be specifically described. Unless otherwise noted, the construction (or shape) of the curtain airbag 12 that is in an inflated or deployed condition will be described. As shown in FIG. 1, the curtain airbag 12 includes a gas supply passage 35, a main chamber 36 as a first deployment portion, and front auxiliary chamber 40 and rear auxiliary chamber 42 as second deployment portions that communicate with the main chamber 36.

The gas supply passage 35 is arranged to be deployed into a cylindrical shape that extends in the longitudinal direction along the roof side portion 18, and the inflator 25 is connected to a middle portion of the gas supply passage 35 as viewed in the longitudinal direction, such that gas can be supplied from the inflator 25 into the gas supply passage 35. Thus, the gas supply passage 35 is arranged to supply gas from the inflator 25 to each portion of the curtain airbag 12 while distributing the gas in the longitudinal direction. In this connection, the inflator 25 may be installed on the center pillar 15 or rear pillar 20 (or C pillar or D pillar).

The main chamber 36 is adapted to be inflated and deployed in a head protection area (see regions B as indicated in FIG. 1) in which the head of an occupant is to be protected against a side impact. More specifically, the main chamber 36 as the first deployment portion includes a front main chamber 36F as a deployment portion for the front seat, and a rear main chamber 36R as a deployment portion for the rear seat. The front main chamber 36F is inflated and deployed over a region including a head protection area Bf in which the head of an occupant seated in the front seat is to be protected against a side impact. The rear main chamber 36R is inflated and deployed over a region including a head protection area Br in which the head of an occupant seated in the rear seat is to be protected against a side impact. The front main chamber 36F and the rear main chamber 36R communicate with each other through the gas supply passage 35, such that gas is supplied from the inflator 25 to the front and rear main chambers 36F, 36R via the gas supply passage 35.

The front auxiliary chamber 40 is deployed at the front side of the front main chamber 36F, to thus form a front-end portion of the curtain airbag 12, and serves to protect the head of a front-seat occupant at the front side of the front seat in a rollover event. When seen in a side view, an upper end portion of the front auxiliary chamber 40 overlaps the front pillar 16, and its lower end portion is located below the belt line BL and overlaps a front portion of a front side door 26 as a side door.

In this embodiment, an upper portion of the front auxiliary chamber 40 communicates with the front end of the gas supply passage 35 deployed along the roof side portion 18, via a gas channel 38 of the curtain airbag 12. Although not illustrated in the drawings, the front auxiliary chamber 40 is adapted to be deployed into a vertically long, generally cylindrical shape having a center axis that extends in the vertical direction. In operation, gas is supplied from the inflator 25 to the front auxiliary chamber 40, via the gas supply passage 35, and the front main chamber 36F. Alternatively, gas may be supplied from the inflator 25 to the front auxiliary chamber 40, independently of (or in parallel with) the front main chamber 36F, using an inner tube, or the like, that is passed through the gas supply passage 35.

Regions A indicated by thin solid lines in FIG. 1 represent test points which an impactor I (see FIG. 3) corresponding to the head of an occupant in a front seat strikes in a rollover test according to FMVSS No. 226 standard. The test point will also be called "impactor striking point" or "impact point". In the curtain airbag 12, the most anterior test point (impact point A1 indicated in FIG. 1) obtained in the above rollover test is covered by the front auxiliary chamber 40, and other test points (impact points A2-A4 indicated in FIG. 1) for the front-seat occupant in the rollover test are covered by the front main chamber 36F.

The rear auxiliary chamber 42 is deployed at the front side of the rear main chamber 36R, to thus form a portion between the rear main chamber 36R and the front main chamber 36F. In this embodiment, the rear auxiliary chamber 42 communicates at its lower end portion with a front lower portion of the rear main chamber 36R, via a gas passage 44. Also, in this embodiment, a seam 64 (which will be described later) provides a partition between the front end of the rear auxiliary chamber 42 and a rear end portion of the front main chamber 36F.

Furthermore, the rear auxiliary chamber 42 is linked (connected) at, its upper end portion to a lower edge portion of the gas supply passage 35 via a seam 60 (which will be described later). In operation, the rear auxiliary chamber 42 is deployed such that a lower end portion of the rear auxiliary chamber 42 is located below the belt line BL and overlaps a rear side door 28. The rear auxiliary chamber 42 serves to protect the head of a rear-seat occupant at the front side of the rear seat in a rollover event.

More specifically, regions C indicated by thin solid lines in FIG. 1 represent test points (impact points) which an impactor I strikes in a rear seat in a rollover test according to FMVSS No. 226 standard. In the curtain airbag 12, the most anterior test point (impact point C1) in the rear seat obtained in the above rollover test is covered by the rear auxiliary chamber 42. At the most anterior test point, a lower end portion of the rear auxiliary chamber 42 whose upper end is connected to the gas supply passage 35 engages with (abuts on) the rear side door 28, so as to restrict or curb outward displacement of the head of an occupant in the vehicle width direction in a rollover event. The most posterior test point for the rear-seat occupant in the above rollover test is covered by the rear main chamber 36R. In FIG. 1, a middle test point is not illustrated.

As shown in FIG. 1, the curtain airbag 12 is provided with a plurality of mounting tabs 46 arranged along an upper edge of the curtain airbag 12. The mounting tabs 46 of the curtain airbag 12 are fixed to the vehicle body framework (including the front pillar 16, roof side portion 18, and the rear pillar 20), by means of fixtures 48, such as clips or bolts and nuts, which extend through the respective tabs 46.

The front end of the curtain airbag 12 as described above, or the front auxiliary chamber 40, is supported by a lower portion of the front pillar 16 via a support cloth (tension cloth) 50 having a generally triangular shape as seen in a side view. Also, the rear end of the curtain airbag 12, or the rear main chamber 36R, is supported by the rear pillar 20 via a support cloth 52.

In the curtain airbag 12, a surface of a foundation cloth that forms at least the front auxiliary chamber 40 is subjected to weave texture sealing, such as silicon coating, so that the internal pressure of the chamber 40 is likely to be maintained. In this embodiment, silicon coating is applied to surfaces of foundation cloths that form the front auxiliary chamber 40 and the rear auxiliary chamber 42.

The front main chamber 36F of the curtain airbag 12 as described above is arranged to be deployed into a cylindrical shape that extends in the longitudinal direction, above the belt line BL. More specifically, as shown in FIG. 1, the front main chamber 36F is disposed below the gas supply passage 35 that extends along the roof side portion 18 and reaches the front auxiliary chamber 40. The front main chamber 36F is arranged to receive gas supplied from the gas supply passage 35, through a gas passage 54 located in a generally middle portion of the chamber 36F as viewed in the longitudinal direction. The gas supply passage 35 and the front main chamber 36F are separated from each other (or partitions between the gas supply passage 35 and the front main chamber 36 are provided) by seams 56, 58, at the front and rear sides of the gas passage 54.

The rear seam 56 is continuous with the seam 60 that provides a partition between the gas supply passage 35 and the rear auxiliary chamber 42, a seam 62 that provide a partition between the rear main chamber 36R and the rear auxiliary chamber 42, a seam 63 that provides a partition between a front cell 42F and a rear cell 42R (which will be described later) of the rear auxiliary chamber 42, and the seam 64 that provides a partition between the rear auxiliary chamber 42 and the front main chamber 36F. On the other hand, the front seam 58 is disposed between the upper end of a seam 65 that provides a partition between the front auxiliary chamber 40 and the front main chamber 36F and the front end of the seam 56, while being spaced apart from the seams 65, 56. Namely, the seam 58 is formed (located) like a floating island.

As described above, the front main chamber 36F is arranged to be deployed in a longitudinally long, cylindrical shape, below the gas supply passage 35, i.e., below the seams

56, 58. A rear end portion of the front main chamber 36F provides a pillar overlapping portion 36FP that overlaps the center pillar 15 as seen in a side view.

In the curtain airbag 12 of this embodiment, the rear auxiliary chamber 42 is divided, or partitioned into the front cell 42F and the rear cell 42R as cells, by the seam 63 that extends in the vertical direction. The seam 63 is bifurcated at its upper end portion. More specifically, the seam 63 diverges or branches at its upper end into a front seam 63F that is curved frontward so as to form a rear, upper edge of the front cell 42F of the rear auxiliary chamber 42, and a rear seam 63R that is curved rearward so as to form a front, upper edge of the rear cell 42R of the rear auxiliary chamber 42.

The front seam 63F and the rear seam 63R are continuous with the seam 60 as the partition between the rear auxiliary chamber 42 and the gas supply passage 35. A part 60A of the seam 60, the front seam 63F and the rear seam 63R cooperate to form a triangular seam 66 as an annular stitched portion that assumes a generally triangular shape as seen in a side view. A portion surrounded by the triangular seam 60 provides an uninflatable portion 68 in the curtain airbag 12.

Figure 2:
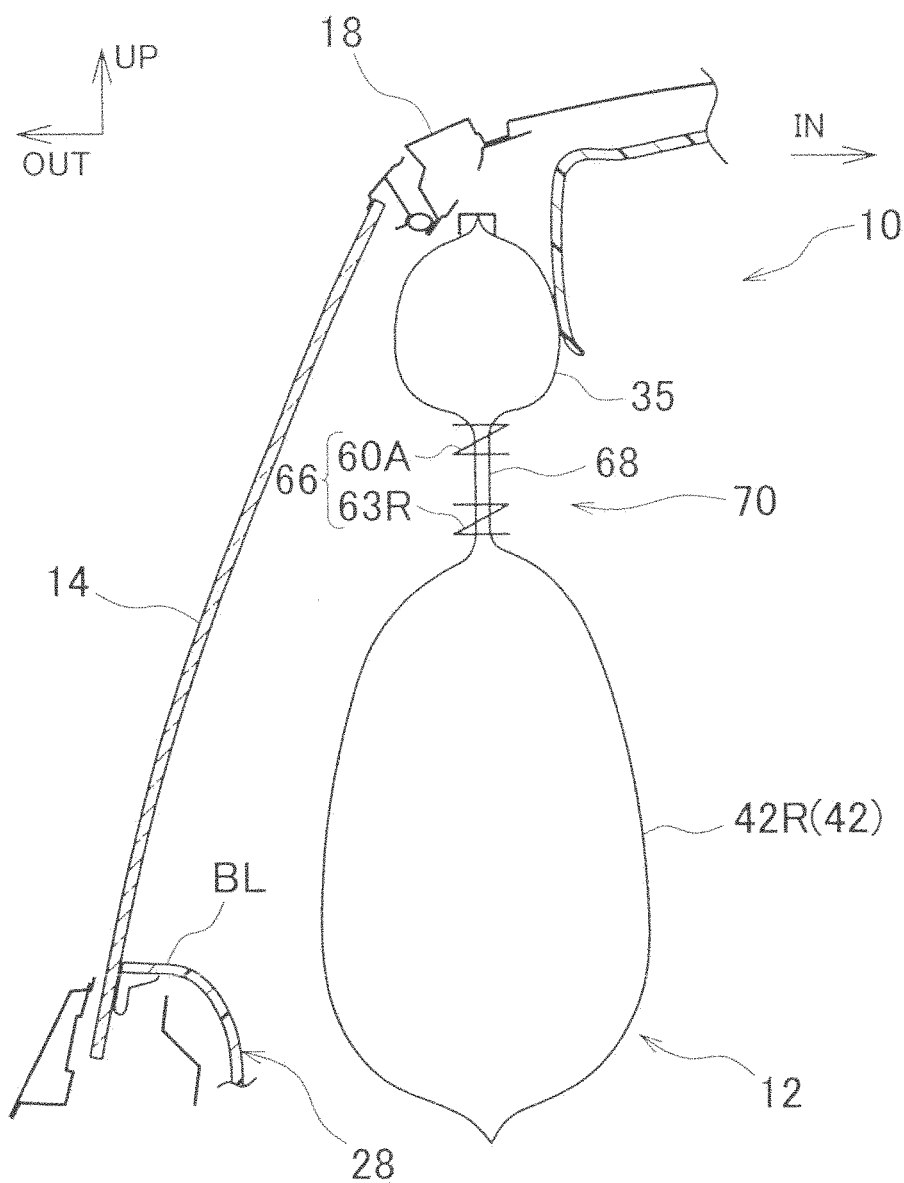
FIG. 2 is an enlarged cross-sectional view showing a section of the curtain airbag system of the first embodiment, which is taken along line II-II in FIG. 1.

Thus, as also shown in FIG. 2, the curtain airbag 12 in an inflated and deployed condition is formed with a concave deployment portion 70 having a bottom provided by the uninflatable portion 68 when viewed in cross-section. The concave deployment portion 70 is formed as a recess having concave walls formed by portions of the gas supply passage 35 and the front cell 42F and rear cell 42R of the rear auxiliary chamber 42, which face the concave deployment portion 70. As shown in FIG. 1, the concave deployment portion 70 is located so as to be aligned with the test point (impact point C1) obtained in the rollover test regarding the rear auxiliary chamber 42. In this embodiment, the center of the concave deployment portion 70 as seen in the side view substantially coincides with the impact point C1. Namely, in the curtain airbag system 10, the concave deployment portion 70 is located at a position where the head of an occupant is likely to strike or hit the curtain airbag 12 in a rollover event.

Figure 4:
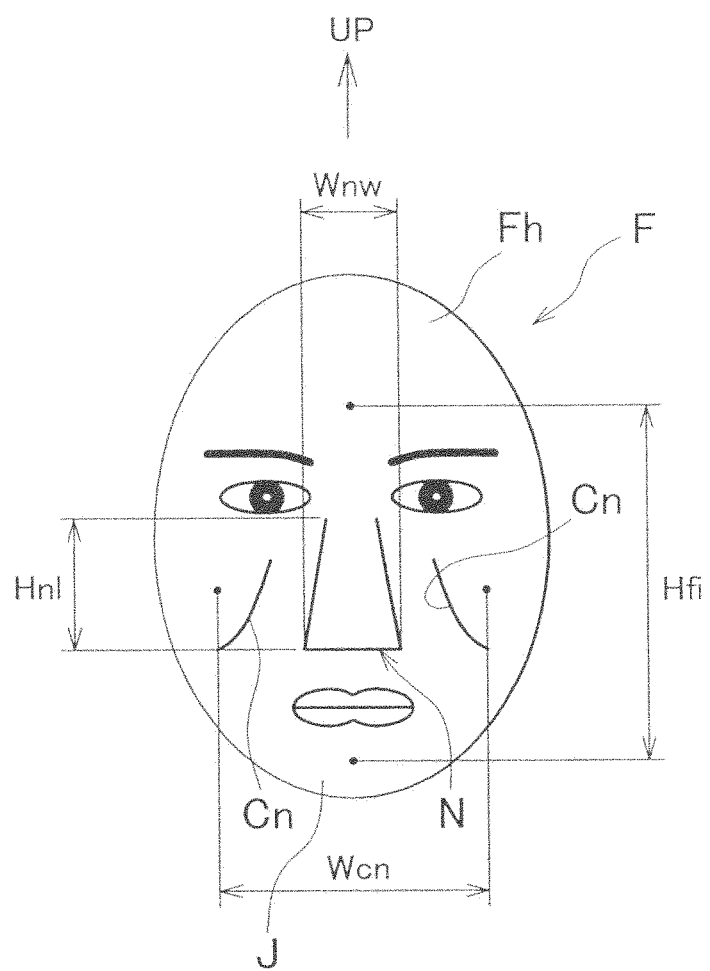
FIG. 4 is a schematic view showing a model of a human face used when setting upper-limit and lower-limit dimensions of a concave deployment portion of the curtain airbag system of FIG. 1 according to the first embodiment.

The width W of the concave deployment portion 70 as measured in the longitudinal direction (which will be simply called "width W") and the height FT of the same portion 70 as measured in the vertical direction (which will be simply called "height H") are set so that each of the maximum value of the width W and the maximum value of the height H falls between given upper and lower limits. More specifically, the lower limit of the width W is set to Wnw corresponding to the width of the nose N in the face F of the occupant as shown in FIG. 4, and the upper limit of the width W is set to Wcn corresponding to an interval between the centers of the cheekbones Cn in the face F of the occupant. Namely, $Wnw \leq W \leq Wcn$.

Also, the lower limit of the height H is set to Hnl corresponding to the length of the nose N in the face F of the occupant as measured in the vertical direction, and the upper limit of the height H is set to Hfj corresponding to an interval between the center of the forehead Fh and the center of the jaw J in the face F of the occupant. Namely, $Hnl \leq H \leq Hfj$.

With the above arrangement, when the head (impactor) of the occupant strikes or hits the region C, a part of the head finds its way into the concave deployment portion 70, to contact the above-mentioned concave walls (the portions of the front cell 42F and rear cell 42R of the rear auxiliary chamber 42, which face the concave deployment portion 70). Namely, the concave deployment portion 70 functions as a contact area enlarging means for increasing the area of contact of the rear auxiliary chamber 42 with the head of the occupant.

Next, the operation of the first embodiment will be described.

In the curtain airbag system 10 constructed as described above, when a side impact occurs to the automobile V equipped with the airbag system 10, the airbag ECU 34 receives a side-impact detection signal from the side impact sensor 30, and actuates the inflator 25 on the side on which the side impact occurred, in response to the side-impact detection signal. Then, the curtain airbag 12 is inflated with gas supplied from the inflator 25, and the main chamber 36, i.e., the front main chamber 36F and the rear main chamber 36R, of the curtain airbag 12 is deployed. As a result, the head of an occupant seated in the front seat on the side-impact side is protected by the front main chamber 36F, and the head of an occupant seated in the rear seat on the side-impact side is protected by the rear main chamber 36R.

If rollover occurs to the automobile V, following the side impact, the airbag ECU 34 receives an R/O detection signal from the rollover sensor 32, and actuates the inflator 25 on the side opposite to the side-impact side, in response to the R/O detection signal. If, on the other hand, rollover occurs to the automobile V, independently of side impact, the airbag ECU 34 receives an R/O detection signal from the rollover sensor 32, and actuates the inflators 25 on the right-hand and left-hand sides of the vehicle, in response to the R/O detection signal. As a result, the curtain airbags 12 are deployed at the opposite sides as viewed in the vehicle width direction, and the head of each occupant is protected against rollover.

When the head of a front-seat occupant is protected by the front auxiliary chamber 40 in a rollover event, the front auxiliary chamber 40 having an upper end portion that overlaps the front pillar 16 and a lower end portion that overlaps the front side door 26 restricts or curbs outward displacement of the head (impactor I) of the front-seat occupant in the vehicle width direction, with its upper end engaging with (or abutting on) the front pillar 16 and its lower end engaging with (or abutting on) the front side door 26.

In the curtain airbag system 10, the front main chamber 36F has a longitudinally long, cylindrical shape having the pillar overlapping portion 36FP at the rear end thereof; therefore, when the head of a front-seat occupant is protected by the front main chamber 36F in a rollover event, outward movement of the head of the front-seat occupant in the vehicle width direction is effectively restricted or curbed in a rollover situation. Also, in the curtain airbag system 10, the front auxiliary chamber 40 has a vertically long cylindrical shape, and engages with the front pillar 16 and the front side door 26; therefore, outward movement of a front-seat occupant in the vehicle width direction is effectively restricted or curbed at the front end of the vehicle compartment (a portion including the impact point A1) in a rollover situation.

Figure 3:
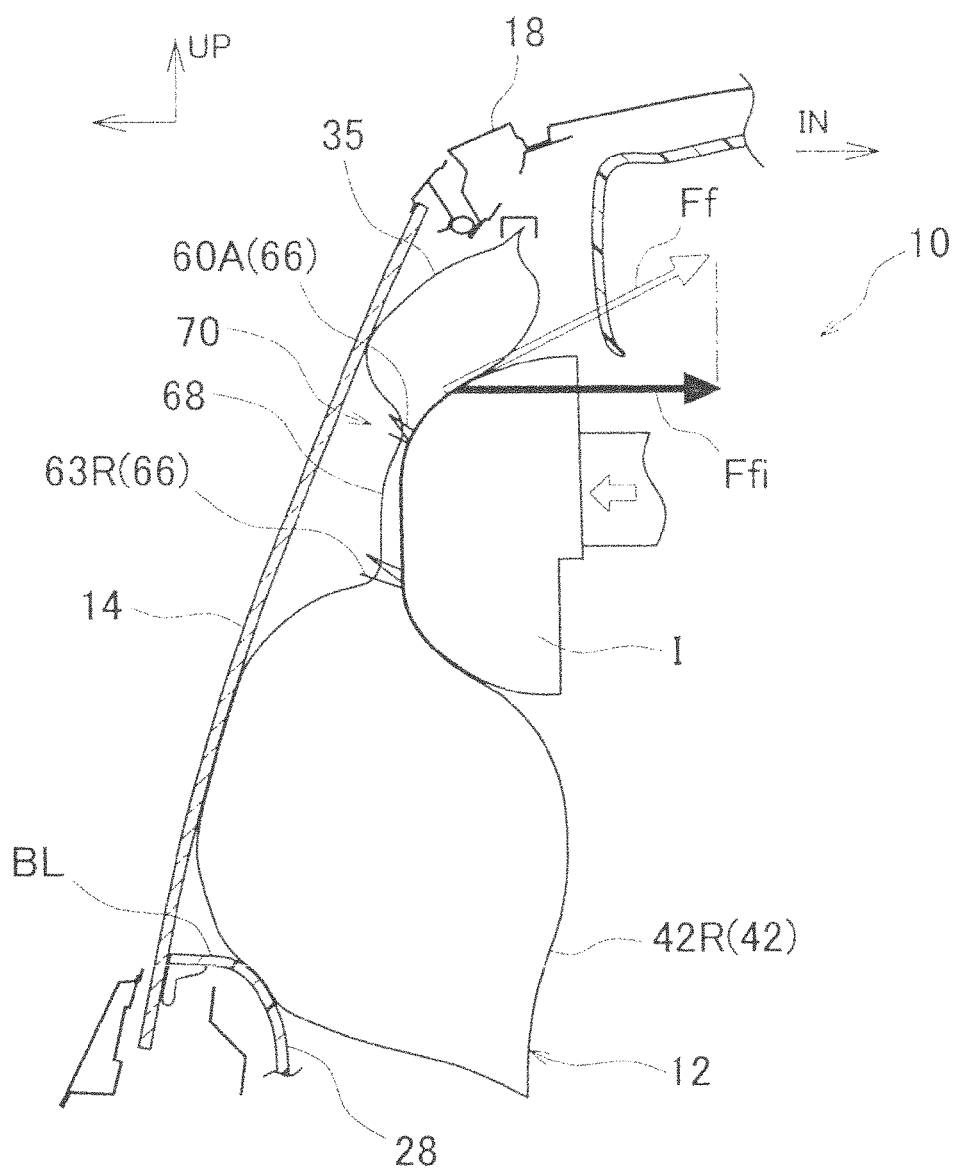
FIG. 3 is an enlarged cross-sectional view schematically showing a process of a rollover test using a rear auxiliary chamber of the curtain airbag system of FIG. 1 according to the first embodiment.

When the head of a rear-seat occupant is protected by the rear auxiliary chamber 42 in a rollover event, the rear auxiliary chamber 42 having an upper end connected to the roof side portion 18 via the gas supply passage 35 is deployed such that its lower end portion overlaps the rear side door 28 in a side view, as shown in FIG. 3. With the rear auxiliary chamber 42 thus deployed, outward displacement of the head (impactor I) of the rear-seat occupant in the vehicle width direction is restricted or curbed.

In the curtain airbag system 10, the rear auxiliary chamber 42 is provided with the concave deployment portion 70. Therefore, when the head of a rear-seat occupant is protected by a portion of the rear auxiliary chamber 42 corresponding to the region C and its vicinity in a rollover event, a part of the head of the occupant finds its way into the concave deployment portion 70, and the area of contact of the occupant's head with the concave walls (each chamber, the gas supply passage) of the concave deployment portion 70 is increased.

In a curtain airbag of a comparative example in which the concave deployment portion 70 is not provided, for example, the contact area between the head of the occupant and the surfaces of the chambers is relatively small. Thus, in the comparative example, the frictional force arising from relative displacement between the curtain airbag and the head of the occupant is small, namely, the force against which the head of the occupant moves in the vehicle width direction is small. In order to increase the frictional force, some countermeasure is required to be taken in the comparative example; for example, the internal pressure of the curtain airbag is increased, or the amount of a portion of the rear auxiliary chamber which overlaps the rear side door 28 is increased. Any of these countermeasures results in an increase of the volume of the airbag or the capacity of the inflator 25.

In the curtain airbag system 10 of this embodiment, which is provided with the concave deployment portion 70 as described above, the contact area between the rear auxiliary chamber 42 and the head of the occupant is larger than that of the comparative example. As the frictional force increases with the increase in the contact area, the head of the occupant is less likely to move outward in the vehicle width direction, i.e., the outward movement of the occupant's head in the vehicle width direction is restricted or curbed due to the frictional force. Namely, in an example in which the impactor I collides with the center (impact point C1) of the concave deployment portion 70, as shown in FIG. 3, the frictional force as indicated by an arrow Ff appears between the impactor I and the rear auxiliary chamber 42, and restricts or curbs the outward movement of the impactor I in the vehicle width direction. More specifically, a component Ffi of the frictional force Ff acts inward in the vehicle width direction, against the inertial force that causes the impactor I to move outward in the vehicle width direction, so that the outward movement of the head of the occupant in the vehicle width direction is restricted or curbed.

With the above arrangement in which the curtain airbag 12 is provided with the concave deployment portion 70, required head protection performance can be provided without increasing the internal pressure of the curtain airbag 12 or increasing the portion of the curtain airbag 12 which engages with the rear side door 28, as in the comparative example. Therefore, the capacity of the inflator 25 can be reduced to be smaller than that of the comparative example.

Thus, the curtain airbag system 10 according to this embodiment ensures occupant protection performance, or capability of protecting an occupant against rollover, without increasing the volume of the curtain airbag 12.

In the illustrated embodiment, the triangular seam 66 that constitutes the concave deployment portion 70 has a generally triangular shape as seen in a side view. Therefore, the uninflatable portion 68 has a long contour length relative to its area, which makes it easier to ensure sufficient thicknesses of portions of the concave deployment portion 70 which provide the concave walls, namely, sufficient thicknesses of the gas supply passage 35 and the front cell 42F and rear cell 42R of the rear auxiliary chamber 42 when deployed. Accordingly, in the arrangement in which the concave deployment portion 70 is formed through deployment of the curtain airbag 12, the rear auxiliary chamber 42 is deployed with a sufficiently large thickness, thereby to provide a shock absorbing effect over a large stroke of the occupant's head.

Further, the concave deployment portion 70 is set between the gas supply passage 35, and the front cell 42F and rear cell 42R of the rear auxiliary chamber 42. Namely, the concave deployment portion 70 is formed by making effective use of a space between the gas supply passage 35 and the rear auxiliary chamber 42. In this embodiment, the concave deployment portion 70 is formed by making effective use of a connecting portion (joining portion) between the seam 60 that provides a partition between the gas supply passage 35 and the rear auxiliary chamber 42, and the seam 63 that provides a partition between the front cell 42F and the rear cell 42R of the rear auxiliary chamber 42.

Figure 5:
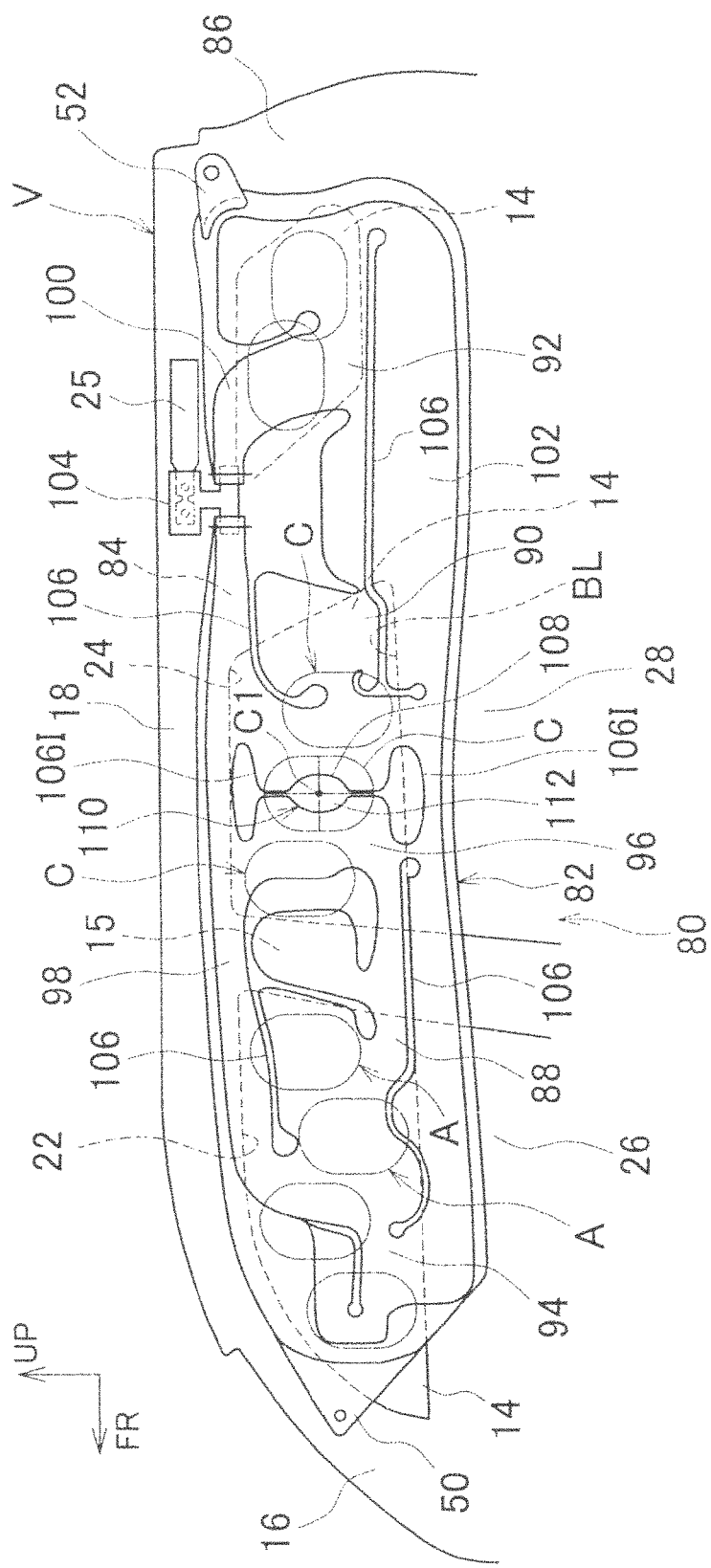
FIG. 5 is a side view as seen from the interior of the vehicle, schematically showing the overall construction of a curtain airbag system according to a second embodiment of the invention.

Next, a curtain airbag system 80 for a vehicle according to a second embodiment of the invention will be described with reference to FIG. 5. In FIG. 5, the same reference numerals as used in FIG. 1 with regard to the first embodiment will be assigned to the same or corresponding elements or components, of which further explanation may not be provided.

FIG. 5 shows a side view similar to that of FIG. 1, showing the curtain airbag system 80 according to the second embodiment of the invention. As shown in FIG. 5, the curtain airbag system 80 is installed on a large-sized vehicle, such as a SUV (sport-utility vehicle), and includes a curtain airbag 82 that is inflated and deployed to extend from the front pillar 16 to one side of a baggage room (or a third-row seat). Namely, the curtain airbag 82 is arranged to extend from the front pillar (A pillar) 16 to a C pillar 84, and to a D pillar 86.

The curtain airbag 82 has a first-row main chamber 88, a second-row main chamber 90, and a third-row main chamber 92 as first deployment portions, and a first-row auxiliary chamber 94 and a second-row auxiliary chamber 96 as second deployment portions. Also, the curtain airbag 82 has a front gas supply passage 98 as a gas supply passage through which gas is supplied to the first-row main chamber 88, second-row main chamber 90 and the second-row auxiliary chamber 96, and a rear gas supply passage 100 through which gas is supplied to the third-row main chamber 92. The front gas supply passage 98 is arranged to be deployed along the roof side portion 18, above the first-row main chamber 88, second-row main chamber 90, and the second-row auxiliary chamber 96. In FIG. 5, three pieces of side windshields 14 are provided along the longitudinal direction, and the rearmost (rightmost in FIG. 5) side windshield 14 is of a fixed type.

Furthermore, the curtain airbag 82 has a door overlapping portion 102 that protrudes downward from the belt line BL, over substantially the entire length of the airbag, and overlaps the front side door 26 and the rear side door 28. The door overlapping portion 102 also functions to communicate adjacent ones of lower portions of the first-row main chamber 88 (the first-row auxiliary chamber 94), the second-row main chamber 90 (the second-row auxiliary chamber 96), and the third-row main chamber 92 with each other.

In the curtain airbag 82 as described above, the respective chambers 88-96 and the gas supply passages 98, 100 are defined or separated from each other as needed by seams 106. Also, the inflator 25 has a larger capacity than the inflator 25 of the curtain airbag system 10 of the first embodiment, and is arranged to supply gas to each of the front gas supply passage 98 and the rear gas supply passage 100, via a diffuser 104 that is shaped like letter "H" lying on its side as seen in a side view.

In the curtain airbag system 80, a concave deployment portion 110 is provided in the second-row auxiliary chamber 96. The concave deployment portion 110 is formed from an uninflatable portion 112 formed by an annular seam 108 as an annular stitched portion. In this embodiment, the annular seam 108, or the periphery of the uninflatable portion 112, has a circular shape or a vertically long, elliptical shape, and the concave deployment portion 110 having a generally circular or elliptical shape as seen in a side view is formed.

Also, in this embodiment, the annular seam 108 is continuous with a pair of seam portions 1061 shaped like floating islands, as part of the seams 106. The seam portions 1061 provide a partition between the second-row auxiliary chamber 96 and the front gas supply passage 98, and provide a partition between the second-row auxiliary chamber 96 and the door overlapping portion 102, respectively. Other components or arrangements of the curtain airbag system 80 are similar to those of the curtain airbag system 10 of the first embodiment.

Thus, the curtain airbag system 80 according to the second embodiment is basically constructed and operated similarly to the curtain airbag system of the first embodiment, to yield substantially the same effects, except for an effect provided by locating the concave deployment portion 70 between the gas supply passage 35 and the rear auxiliary chamber 42.

While the triangular seam 66, or the annular seam 108, is continuous with other seams 60, 63, 106 in each of the illustrated embodiments, the present invention is not limited to this arrangement. For example, an independent, annular seam may be formed so that a concave deployment portion, or the like, is formed (deployed).

In each of the illustrated embodiments, each chamber or the gas supply passage is deployed, in the event of a side impact and rollover, with gas supplied from the inflator 25. However, at least a part of the front auxiliary chamber 40, rear auxiliary chamber 42, first-row auxiliary chamber 94, and the second-row auxiliary chamber 96 may be formed as a delay chamber or chambers that is/are deployed later than the remaining portions. The delay chamber may be formed so as to be supplied with gas through a restrictor passage having an inside diameter of, for example, 40 mm to 70 mm.

While the uninflatable portions 68, 112 provide the concave deployment portions 70, 110 in the illustrated embodiments, the present invention is not limited to this arrangement. For example, the uninflatable portion 68, 112 may be replaced by a deployment thickness restricted portion that is deployed with its thickness reduced to be smaller than that of its surroundings. Also, the annular stitched portion of the invention is not limited to a continuously annular shape, but may assume an intermittently or discontinuously annular shape.

While the front auxiliary chamber 40 is rolled or folded, and stored in the front pillar 16 in the illustrated first embodiment, the invention is not limited to this arrangement. For example, the front auxiliary chamber 40 that is rolled or folded may be folded back on a front end portion of the main chamber 36, and stored in the roof side portion 18 along with the main chamber 36, or the front auxiliary chamber 40 that is rolled or folded may be placed in a roof along a front edge of the roof. Namely, according to the invention, the whole body of the airbag is not necessarily stored in the roof side portion 18, but the airbag may be otherwise constructed provided that at least the main chamber 36 is stored in the roof side portion 18.

While the present invention is applied to the automobile V having the rear seats and the rear side doors 28 in the illustrated embodiments, the invention is not limited to this application. For example, the invention may be applied to automobiles, such as a two-door automobile having no rear side doors 28, two-seater automobile having no rear seats, and so forth.

The curtain airbag 12 of the illustrated embodiment may be woven by a Jacquard loom. That is, the curtain airbag 12 may be a one-piece woven airbag. In the one-piece woven curtain airbag, portions that provide seams or stitched portions are linked and woven together, so that the airbag is partitioned or divided into respective chambers by the woven texture of the seams. A seam may be formed by sewing two foundation clothes together.

Needless to say, the invention may be otherwise embodied with various changes or modifications, without departing from the principle of the invention.

What is claimed is:

1. A curtain airbag system for a vehicle, comprising:
a curtain airbag that is stored in a folded state in an upper edge portion of a portion of a vehicle body in which a side windshield is mounted, wherein
the curtain airbag comprises:
a gas supply passage that is deployed along the upper edge portion of the portion of the vehicle body in which the side windshield is mounted;
a first deployment portion to which gas is supplied through the gas supply passage, so that the first deployment portion is inflated and deployed below the gas supply passage in the event of a side impact or rollover of the vehicle;
a second deployment portion to which gas is supplied through the gas supply passage or the first deployment portion, so that the second deployment portion is deployed at a vehicle front side of the first deployment portion, in the event of at least rollover of the vehicle, the second deployment portion is deployed below the gas supply passage, as seen in the side view, such that a lower end portion of the second deployment portion is located below a belt line, and the second deployment portion includes two cells that are arranged in a longitudinal direction of the vehicle, the lower end of the second deployment portion extends beyond a lower end of the first deployment portion; and
a concave deployment portion formed within the second deployment portion or in a part of a space between the second deployment portion and the gas supply passage as seen in a side view, the concave deployment portion being defined by a looped line; the looped line forming a stitched portion defined by a generally triangular shape that includes a base and is line-symmetrical;
wherein the stitched portion provides a partition between a lower edge of the gas supply passage and upper end portions of the cells arranged in the longitudinal direction and operable to restrict deployment of a part of the second deployment portion or the part of the space between the second deployment portion and the gas supply passage.

2. The curtain airbag system according to claim 1, wherein:
the first deployment portion comprises a rear main chamber operable to protect a head of an occupant seated in a rear seat of the vehicle; and
the second deployment portion comprises a rear auxiliary chamber that communicates with the rear main chamber.

3. The curtain airbag system according to claim 2, wherein the concave deployment portion is located at a position where the head of the occupant is likely to strike the curtain airbag in the event of rollover of the vehicle.

4. The curtain airbag system according to claim 1, wherein the concave deployment portion is located at a position where the head of the occupant is likely to strike the curtain airbag in the event of rollover of the vehicle.

5. The curtain airbag system of claim 1 wherein the two cells arranged in a longitudinal direction of the vehicle are defined by a pair of substantially vertically outer seams and an inner seam portion that runs substantially vertically.

6. A curtain airbag system for a vehicle, comprising:

a curtain airbag that is stored in a folded state in an upper edge portion of a portion of a vehicle body in which a side windshield is mounted, wherein the curtain airbag comprises:

a gas supply passage that is deployed along the upper edge portion of the portion of the vehicle body in which the side windshield is mounted;

a first deployment portion to which gas is supplied through the gas supply passage, so that the first deployment portion is inflated and deployed below the gas supply passage in the event of a side impact or rollover of the vehicle;

a second deployment portion to which gas is supplied through the gas supply passage or the first deployment portion, so that the second deployment portion is deployed at a vehicle front side of the first deployment portion, in the event of at least rollover of the vehicle, the second deployment portion is deployed below the gas supply passage, as seen in the side view, such that a lower end portion of the second deployment portion is located below a belt line, and the second deployment portion includes two cells that are arranged in a longitudinal direction of the vehicle, the lower end of the second deployment portion extends beyond a lower end of the first deployment portion; and a concave deployment portion formed within the second deployment portion or in a part of a space between the second deployment portion and the gas supply passage as seen in a side view, the concave deployment portion comprising a generally polygonal line; the generally polygonal line forming a stitched portion defined by a generally triangular shape that includes a base and is line-symmetrical;

wherein the stitched portion provides a partition between a lower edge of the gas supply passage and upper end portions of the cells arranged in the longitudinal direction and operable to restrict deployment of a part of the second deployment portion or the part of the space between the second deployment portion and the gas supply passage.

7. The curtain airbag system of claim 6 wherein the two cells arranged in a longitudinal direction of the vehicle are defined by a pair of substantially vertically outer seams and an inner seam portion that runs substantially vertically.

* * * * *